US008561410B2

(12) United States Patent
Mulcaire

(10) Patent No.: US 8,561,410 B2
(45) Date of Patent: Oct. 22, 2013

(54) OUTLET GUIDE VANE STRUCTURE

(75) Inventor: Thomas G. Mulcaire, Derby (GB)

(73) Assignee: Rolls-Royce PLC, London (GB)

( * ) Notice: Subject to any disclaimer, the term of this patent is extended or adjusted under 35 U.S.C. 154(b) by 326 days.

(21) Appl. No.: 13/010,296

(22) Filed: Jan. 20, 2011

(65) Prior Publication Data

US 2011/0192166 A1 Aug. 11, 2011

(30) Foreign Application Priority Data

Feb. 8, 2010 (GB) .................................. 1001974.3

(51) Int. Cl.
*F02C 1/00* (2006.01)

(52) U.S. Cl.
USPC ........................................................... 60/751

(58) Field of Classification Search
USPC ........... 60/751; 415/191, 209.3, 209.4, 210.1, 415/211.2
See application file for complete search history.

(56) References Cited

U.S. PATENT DOCUMENTS

| | | | | |
|---|---|---|---|---|
| 2,986,231 | A * | 5/1961 | Hellstrom | 55/317 |
| 3,452,542 | A * | 7/1969 | Saferstein et al. | 60/752 |
| 3,750,397 | A * | 8/1973 | Cohen et al. | 60/804 |
| 4,815,272 | A * | 3/1989 | Laurello | 60/806 |
| 5,165,850 | A | 11/1992 | Humke et al. | |
| 5,249,921 | A | 10/1993 | Stueber et al. | |
| 5,609,467 | A | 3/1997 | Lenhart et al. | |
| 5,632,141 | A * | 5/1997 | Sloop et al. | 60/782 |
| 2006/0162336 | A1* | 7/2006 | Cayre et al. | 60/751 |
| 2007/0119145 | A1* | 5/2007 | O'Neill et al. | 60/39.092 |

FOREIGN PATENT DOCUMENTS

| | | | |
|---|---|---|---|
| EP | 2 123 863 | A1 | 11/2009 |
| WO | WO 2009/119126 | A1 | 10/2009 |

OTHER PUBLICATIONS

Search Report issued in British Application No. GB 1001974.3 dated Apr. 20, 2010.

* cited by examiner

*Primary Examiner* — Phutthiwat Wongwian
(74) *Attorney, Agent, or Firm* — Oliff & Berridge, PLC

(57) ABSTRACT

An outlet guide vane structure for a gas turbine engine includes outlet guide vanes supported between inner and outer outlet guide walls. The guide walls form a diffuser aft of the guide vanes. The outer guide wall is secured directly to a compressor casing. A support structure, for example for supporting turbine nozzle guide vanes, is connected to an outer case of the engine at a flange. The support structure includes struts which pass through the outlet guide vane structure to provide a load path by which loads on the support structure are transferred to the outer case independent of the outlet guide vane structure.

16 Claims, 3 Drawing Sheets

OUTLET GUIDE VANE STRUCTURE

BACKGROUND

This invention relates to an outlet guide vane structure in a gas turbine engine.

A typical gas turbine engine comprises an axial flow compressor supplying high pressure air to a combustor, which may be an annular combustor centred on the engine axis. It is usual for outlet guide vanes to be provided aft of the compressor in order to straighten the flow from the compressor and direct it appropriately to the combustor. It is also common for the air to be expanded by a diffuser, situated aft of the outlet guide vanes, in order to bring the air velocity down to a level at which combustion can be supported.

SUMMARY

In this specification, the expressions “forward” and “aft” refer respectively to upstream and downstream directions with respect to the direction of gas flow through the engine. Axial refers to the engine axis FIGS. 1 and 2 of the accompanying drawings show a previously proposed gas turbine engine structure. FIG. 1 is a partial axial cross-section through the engine in the region of a high pressure (HP) compressor stage 2 and a combustor 4, and FIG. 2 is a view on the line II-II of an outlet guide vane (OGV) structure 6 of the engine.

The HP compressor 2 comprises an annular gas flow path 8 bounded at its outer periphery by a compressor casing 10. The compressor casing 10 is fixed with respect to an engine outer case 12 and carries a series of stator vane rows 14 which alternate along the flow path 8 with rotor blade rows 16. The OGV structure 6 comprises an annular array of outlet guide vanes 18 which extend between inner and outer outlet guide walls 20, 22. Aft of the vanes 18, the walls 20, 22 diverge in the direction towards the combustor 4 to form a diffuser 24.

The OGV structure 6 is held in position by a support structure which comprises a forward mounting cone 26 and an aft mounting cone 28. The OGV structure 6 is bolted to the aft mounting cone 28 at a flange 30, and is secured to the forward mounting flange 26 by a hook connection 32 and a bolted connection at a flange 34.

The forward mounting cone 26 is connected at its forward and radially outer periphery to the engine casing 12. The aft mounting cone 28 comprises an inner air casing and is connected to an annular platform 36 carrying turbine nozzle guide vanes 38.

High pressure air delivered by the compressor 2 is passed through the annular passage formed by the inner and outer outlet guide walls 20, 22 to the combustor 4. Some of the air passes through the combustor 4 itself, to be mixed with fuel and ignited. The high temperature combustion gases then flow past the turbine nozzle guide vanes 38 to turbine stages of the engine. Another part of the air from the OGV structure 6 flows around the combustor 4 to provide a cooling effect. Some of the cooling air enters the combustor 4 through openings in its wall to mix with the combustion gases.

The outlet guide vanes 18 straighten the air flow before it is expanded in the diffuser 24. It will be appreciated that it is important for the position and orientation of the OGV structure 6 to be maintained accurately, in order to receive the air from the flow path 8 and to direct it properly to the combustor 4.

In operation of the engine, a substantial pressure drop exists across the turbine nozzle guide vanes 38. In addition, the flowing combustion gases exert a substantial torque on the turbine nozzle guide vanes 38 about the engine axis. This torque, and the axial force resulting from the pressure drop, is transferred to the outer case 12 through the mounting cones 28, 26, and consequently through the outlet guide vanes 18.

Additional loading is applied to the OGV structure 6 during transient engine conditions. For example, during acceleration, the increasing temperature of the air delivered from the compressor 2 heats the OGV structure 6 very quickly. The aft mounting cone 28 is also heated rapidly while the forward mounting cone 26 is not immediately exposed to the hotter air and so heats up more slowly. As a result, the thermal expansion of the OGV structure 6 and the aft mounting cone 28 occurs more quickly than that of the forward mounting cone 26, creating additional thermally induced stresses in the OGV structure 6, and in particular in the vanes 18.

It is known, for example, from U.S. Pat. No. 5,249,921 and U.S. Pat. No. 5,165,850 to reinforce the OGV structure, for example by providing radial dividers or struts within the diffuser 24 which isolate the vanes 18 at least partially from the loads transferred between the guide walls 20 and 22.

However, such struts and dividers add weight to the OGV structure 6.

According to one aspect of the invention there is provided a gas turbine engine having an outlet guide vane structure, the gas turbine engine having an outer case accommodating a combustor, a compressor having a compressor casing, and a combustor support structure which is fixed to the outer case and extends from the compressor to a rearward surface of the combustor, the outlet guide vane structure comprising an array of outlet guide vanes disposed between inner and outer outlet guide walls, the outlet guide vane structure being supported directly by the compressor casing wherein the combustor support structure comprises struts which extend through openings in the inner and outer outlet guide walls.

The inner and outer guide walls may extend aft of the outlet guide vanes to form a diffuser having an aft edge and a fuel injector is located between the aft edge and the combustor.

The support structure may comprise an inner air casing on which are mounted turbine nozzle guide vanes which are situated aft of the combustor.

Fairings extend between the inner and outer guide walls and at least partially surround the respective struts.

According to a further aspect of the present invention there is provided an outlet guide vane structure in a gas turbine engine, the engine having an outer case accommodating a combustor, a compressor having a compressor casing, and a combustor support structure which is fixed to the outer case and extends between the compressor and the combustor, the outlet guide vane structure comprising an array of outlet guide vanes disposed between inner and outer outlet guide walls, the outlet guide vane structure being supported directly by the compressor casing, and characterised in that the combustor support structure comprises struts which extend through openings in the inner and outer outlet guide walls.

In an embodiment in accordance with the present invention, the struts may transfer load from the combustor and particularly the nozzle guide vanes aft of the combustor through the support structure to the outer case without imposing loading on the outlet guide vane structure. In this embodiment the struts may also transfer load through the support structure to the outer case without receiving loading from the array of outlet guide vanes.

The OGV structure may be secured to the compressor casing at respective flanges on the outer wall of the OGV structure and on the compressor casing, for example by a bolted connection between the flanges.

The struts may extend through the openings in the inner and outer outlet guide walls at positions aft of the outlet guide vanes.

The support structure may comprise an inner air casing which carries an array of turbine nozzle guide vanes situated aft of the combustor. The inner air casing thus transfers to the outer case loads generated by the turbine nozzle guide vanes. The support structure may comprise a circumferential array of apertures which are separated from one another by the struts. The OGV structure may comprise fairings which extend between the inner and outer walls and which at least partially surround the respective struts. The openings in the inner and outer outlet guide walls may be in the form of slots which may open at the aft edges of the respective walls.

The inner and outer outlet guide walls may extend aft of the vanes to form a diffuser. The diffuser may be provided with a splitter for splitting flow through the diffuser, for example into inner and outer annular streams. The splitter may comprise a plurality of arcuate sections, each section extending between adjacent fairings.

The outlet guide vanes may be embodied in a single ring component. The ring component may be a first component of the OGV structure, and may comprise the outlet guide vanes and inner and outer vane walls, a second component of the OGV structure comprising the diffuser having inner and outer diffuser walls, the respective vane walls and diffuser walls engaging each other at circumferential joints to define the inner and outer outlet guide walls.

The outer diffuser wall may be connected to the compressor casing, the outer vane wall then being retained between the compressor casing and outer diffuser wall.

For a better understanding of the present invention, and to show more clearly how it may be carried into effect, reference will now be made, by way of example, to the accompanying drawings, in which:

BRIEF DESCRIPTION OF THE DRAWINGS

In the Figures similar features are designated by the same reference numbers.

DETAILED DESCRIPTION OF THE EMBODIMENTS

Figure 1:
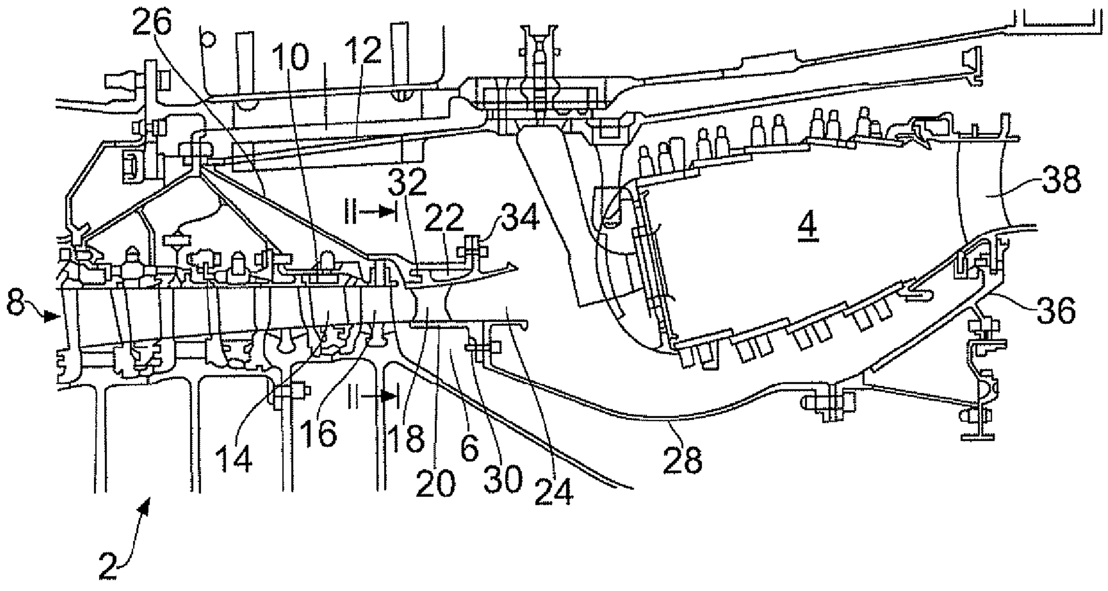
FIG. 1 (Prior Art)
FIGS. 1 and 2, as referred to above, show a prior proposal for a gas turbine engine.
Figure 2:
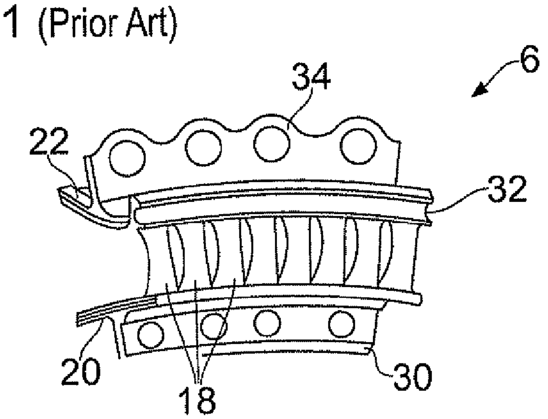
FIG. 2 (Prior Art)
Figure 3:
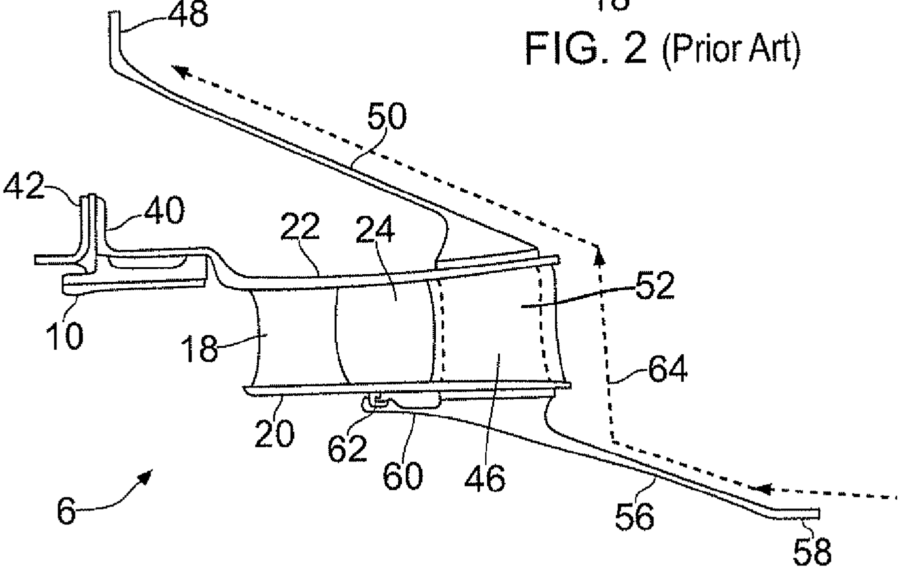
FIG. 3 shows an outlet guide vane structure in accordance with the present invention.

FIG. 3 shows an OGV structure 6 in accordance with the present invention, to replace the OGV structure 6 of FIG. 1. The OGV structure 6 of FIG. 3 comprises outlet guide vanes 18 disposed between inner and outer outlet guide walls 20, 22. The walls 20, 22 diverge aft of the vanes 18 to form a diffuser 24.

In FIG. 1, the outer wall 22 of the OGV structure 6 is secured to the forward mounting cone 26, and thence to the outer case 12. However, in the embodiment of FIG. 3, the outer wall 22 is connected directly to the compressor casing 10. For this purpose, the outer wall 22 has a flange 40 which is bolted to a flange 42 of the compressor casing 10.

Figure 5:
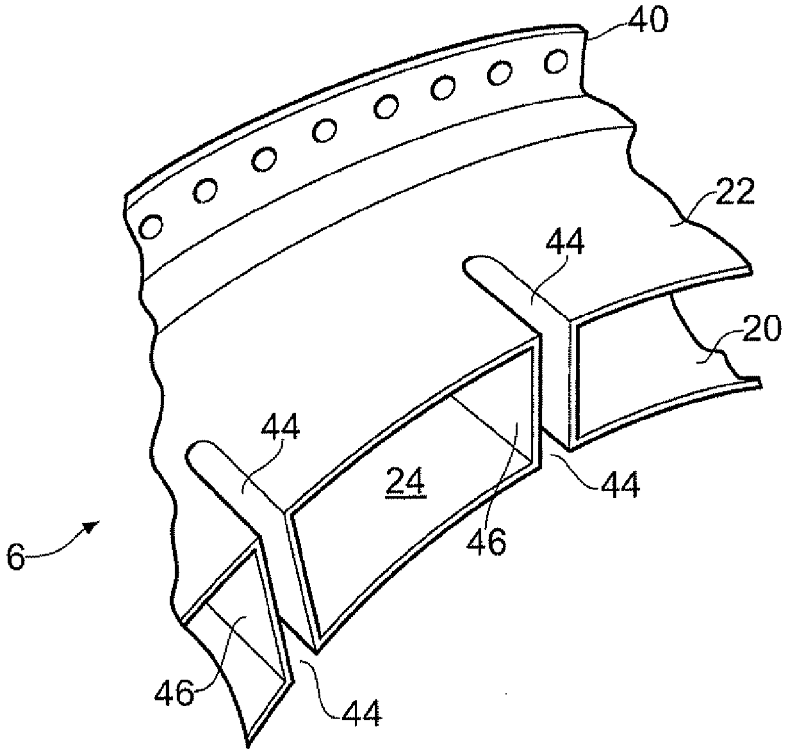
FIG. 5 is a perspective view of another component of the structure shown in FIG. 3.

As shown in FIG. 5, the inner and outer guide walls 20, 22 of the OGV structure 6 are provided with openings in the form of slots 44 which extend forwards from the aft edges of the walls 20, 22. Fairings 46, which coincide with the slots 44, extend across the diffuser 24 between the walls 20 and 22.

Figure 4:
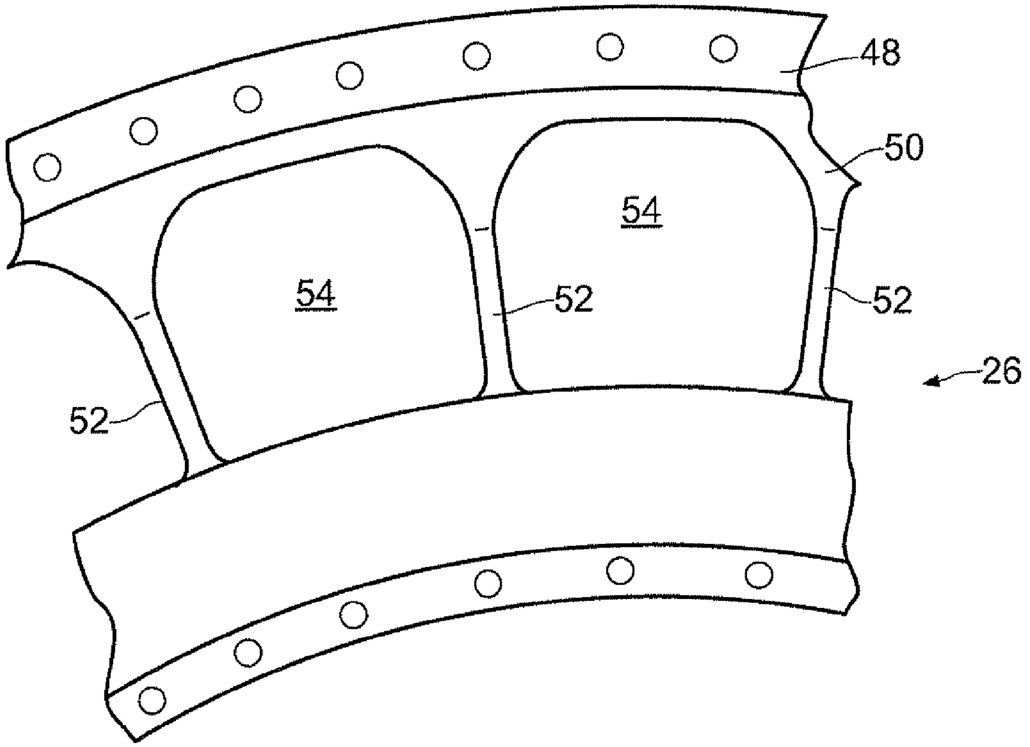
FIG. 4 is a perspective view of one component of the structure shown in FIG. 3.

As shown in FIG. 4, the forward mounting cone 26 has a flange 48, for connection to the outer case 12, followed by a conical region 50 which merges into an array of generally radially extending struts 52. Adjacent struts define apertures 54 which extend into the conical region 50. As can be appreciated from FIG. 3, the struts 52 have a substantial dimension in the axial direction. The struts 52 are accommodated in respective ones of the slots 44 and are enclosed, at least at their forward edges and along their flanks by the fairings 46. The struts 52 are accommodated within the slots 44 and the fairings 46 with sufficient clearance to allow the struts 52 to move within the slots 44 and fairings 46 as a result of loads and thermal stresses which arise during operation of the engine, without transmitting any forces to the OGV structure 6.

Radially inwards of the OGV structure 6, the struts 52 meet a conical connecting piece 56 provided with a flange 58 for bolting to the inner air casing 28. A forward projection 60 at the radially outer end of the connecting piece 56 accommodates a seal 62 which engages the inner guide wall 20 to prevent leakage of air.

In operation, loads transmitted to the connecting piece 56, and thus to the forward mounting cone 36, by the inner air casing 28 are transferred to the outer case 12 along a load path 64 indicated by dashed arrows. This load path 64 passes through the OGV structure 6 without transferring any significant load to the OGV structure 6. The fairings 46 provide a smooth flow of air over the struts 52. Because the struts 52 are relatively thin in the circumferential direction, any disturbance of the air through the diffuser 24 is kept to a minimum, while the substantial axial dimension of the struts 52 provides sufficient material to withstand the loads that are transferred along the load path 64.

The OGV structure 6 comprising the vanes 18, the inner and outer guide walls 20, 22 and the fairings 46 can be produced as a single ring. For example, the ring could be manufactured by casting to nett shape, or by casting an oversized (near nett shape) structure which is finished by a suitable machining process which can be a conventional machining process or a non-conventional machining process such as electrochemical machining. As a further alternative, the ring could be formed by machining (conventionally or electrochemically) from a ring forging. The OGV structure 6 could be produced in its entirety as a single component, but in other embodiments the vanes 18 and the diffuser 24 may be formed as separate ring components which are subsequently joined together, for example by welding, around the inner and outer guide walls 20, 22.

Because the OGV structure 6 is secured directly to the compressor casing 10 and does not form part of the load path 64, it can be accurately aligned with the compressor flow path 8. In particular, the outer guide wall 22 can be accurately aligned with the rotor casing 10, and the inner guide wall 20 can be accurately aligned with a rotor platform on which the rotor blades 16 are supported. Furthermore, adequate sealing between the compressor casing 10 and the outer guide wall 22 can be achieved.

By passing the struts 52 through the inner and outer guide walls 20, 22 of the OGV structure 6, the overall length of the assembly, between the compressor 2 and the combustor 4, can be minimised. Despite the interface between the struts 52 and the OGV structure 6, the absence of any load transfer from the struts 52 to the OGV structure 6 means that radial movement of the diffuser 24 is minimised, with the result that the air flow from the diffuser 24 suffers little movement relative to the combustor 4, so enabling consistent combustion aerodynamics.

The fairings 46 provide a fully sealed gas flow path through the diffuser 24. Consequently, the struts 52 do not suffer from direct impingement by the gas flow through the diffuser 24, with the result that they are insulated from sudden changes in gas temperature. This alleviates some of the thermal stresses induced in the proposed structure shown in FIG. 1.

The seal 62 prevents the forward flow of high pressure air from the region radially outside the inner air casing 28.

Figure 6:
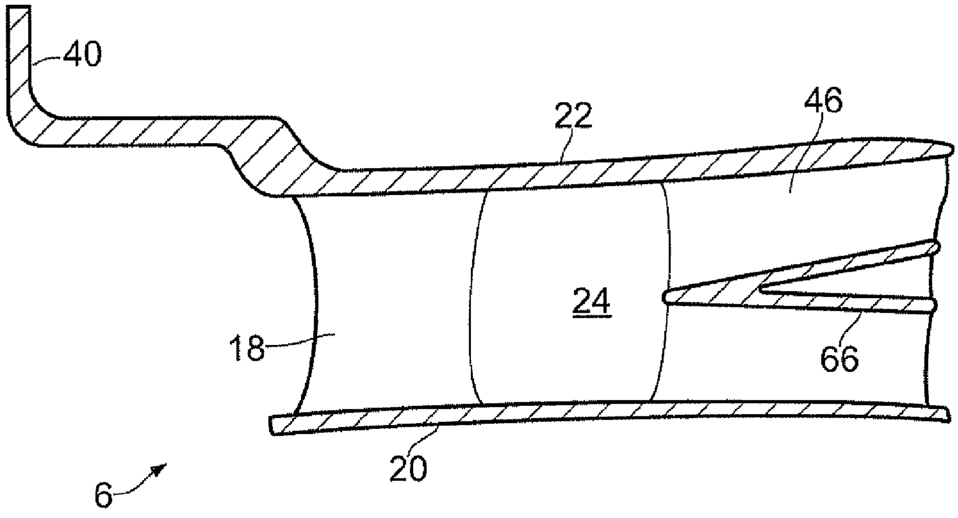
FIG. 6 shows an alternative embodiment of the component shown in FIG. 5.

FIG. 6 shows an alternative configuration for the OGV structure 6. This structure conforms in many respects to that of FIG. 3, but incorporates a splitter 66 in the diffuser 24. The splitter comprises a series of arcuate sections which extend between adjacent fairings 46 to form a ring around the OGV structure 6. Thus, the fairings 46 serve as supports for the sections of the splitter 66. The splitter 66 increases the performance of the diffuser 24 for a given axial length.

Figure 7:
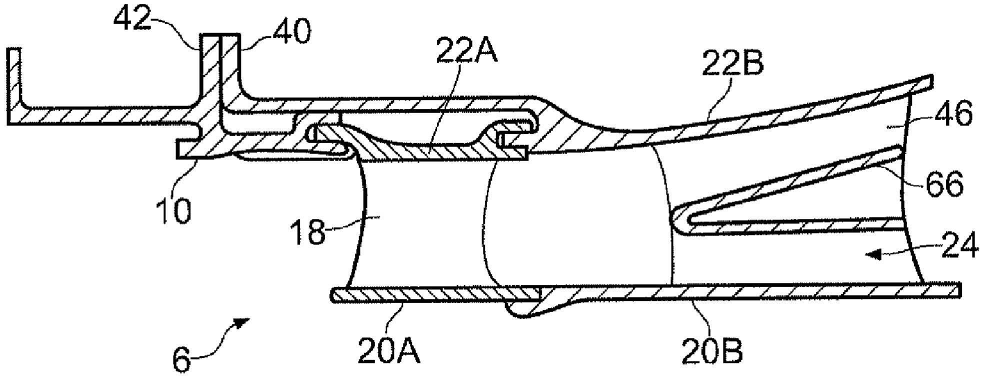
FIG. 7 shows a further variant of the structure shown in FIG. 3.

A further embodiment is shown in FIG. 7. In this embodiment, the OGV structure is manufactured as two separate components of which the first component comprises the guide vanes 18 and inner and outer vane walls 20A and 22A, while the second component comprises inner and outer diffuser walls 20B and 22B, the fairings 46 and the splitter 66.

In this embodiment, the flange 40 is provided on a projection 68 of the outer diffuser wall 22B. Consequently, the OGV structure 6 can be assembled to the compressor casing 10 by sandwiching the outer vane wall 22A between the compressor casing 10 and the outer diffuser wall 22B. As in the embodiment of FIGS. 3 to 6, the first component comprising the vanes 18 and the second component comprising the diffuser 22 can be manufactured as respective single rings. However, the structure shown in FIG. 7 makes it possible for the first component to be constructed as a series of arcuate segments, each containing a series (for example, 20) of the vanes 18. Although assembly of the array of vanes 18 from such arcuate segments requires the provision of inter-segment seals, the arrangement provides the advantage that, in the event of damage to some of the vanes 18, it is necessary to replace only the damaged segments, rather than an entire ring of the vanes 18.

The invention claimed is:

1. A gas turbine engine having an outlet guide vane structure, the gas turbine engine comprising:
- an outer case including:
  - an annular combustor;
  - a compressor having a compressor casing, and
  - a combustor support structure which is fixed to the outer case and extends from the compressor to a rearward surface of the combustor, the outlet guide vane structure comprising an array of outlet guide vanes disposed between inner and outer outlet guide walls, the outlet guide vane structure being supported directly by the compressor casing wherein the combustor support structure comprises struts which extend through openings in the inner and outer outlet guide walls, and fairings extend between the inner and outer outlet guide walls and at least partially surround the respective struts.

2. A gas turbine engine according to claim 1, wherein the inner and outer guide walls extend aft of the outlet guide vanes to form a diffuser having an aft edge and a fuel injector is located between the aft edge and the combustor.

3. A gas turbine engine as claimed in claim 1, wherein the support structure comprises an inner air casing on which are mounted turbine nozzle guide vanes which are situated aft of the combustor.

4. An outlet guide vane structure in a gas turbine engine, the gas turbine engine comprising:
- an outer case including:
  - an annular combustor;
  - a compressor having a compressor casing; and
  - a combustor support structure which is fixed to the outer case and extends between the compressor and the combustor, the outlet guide vane structure comprising an array of outlet guide vanes disposed between inner and outer outlet guide walls, the outlet guide vane structure being supported directly by the compressor casing, and wherein the combustor support structure comprises struts which extend through openings in the inner and outer outlet guide walls, and fairings extend between the inner and outer outlet guide walls and at least partially surround the respective struts.

5. An outlet guide vane structure as claimed in claim 4, wherein the outer guide wall of the outlet guide vane structure and the compressor casing are provided with respective flanges which are secured together by a bolted connection.

6. An outlet guide vane structure as claimed in claim 4, wherein the struts are disposed aft of the outlet guide vanes.

7. An outlet guide vane structure as claimed in claim 4, wherein the support structure comprises an inner air casing on which are mounted turbine nozzle guide vanes which are situated aft of the combustor.

8. An outlet guide vane structure as claimed in claim 4, wherein the support structure comprises a circumferential array of apertures which are separated from one another by the struts.

9. An outlet guide vane structure as claimed in claim 4, wherein the openings in the inner and outlet guide walls comprise slots which open at the aft edges of the respective guide walls.

10. An outlet guide vane structure as claimed in claim 4, wherein the inner and outer guide walls extend aft of the outlet guide vanes to form a diffuser.

11. An outlet guide vane structure as claimed in claim 10, wherein the diffuser is provided with a splitter for splitting flow through the diffuser.

12. An outlet guide vane structure as claimed in claim 4, wherein the in which the diffuser is provided with a splitter and the splitter comprises a plurality of arcuate sections, each section extending between adjacent fairings.

13. An outlet guide vane structure as claimed in claim 4, wherein the array of outlet guide vanes is formed as a single ring.

14. An outlet guide vane structure as claimed in claim 10, further comprising a first component comprising the outlet guide vanes and inner and outer vane walls, and a second component comprising the diffuser having inner and outer diffuser walls, the respective vane walls and diffuser walls engaging each other to define the inner and outer outlet guide walls.

15. An outlet guide vane structure as claimed in claim 14, wherein the first component comprises a plurality of segments, each segment comprising a plurality of the outlet guide vanes.

16. An outlet guide vane structure as claimed in claim 14, wherein the outer diffuser wall is connected to the compressor casing, the outer vane wall being retained between the compressor casing and the outer diffuser wall.

* * * * *